Dec. 18, 1945.   J. A. SAFFIR   2,391,106
METHOD OF MAKING ARTIFICAL TEETH
Filed Sept. 24, 1941
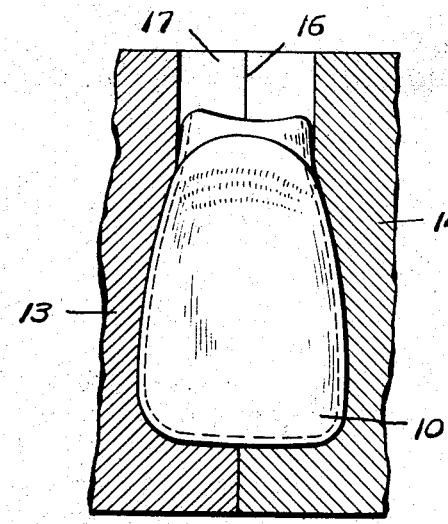
Fig.1.
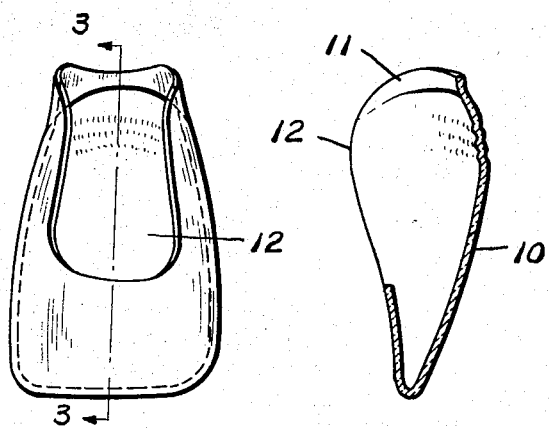
Fig.2.   Fig.3.
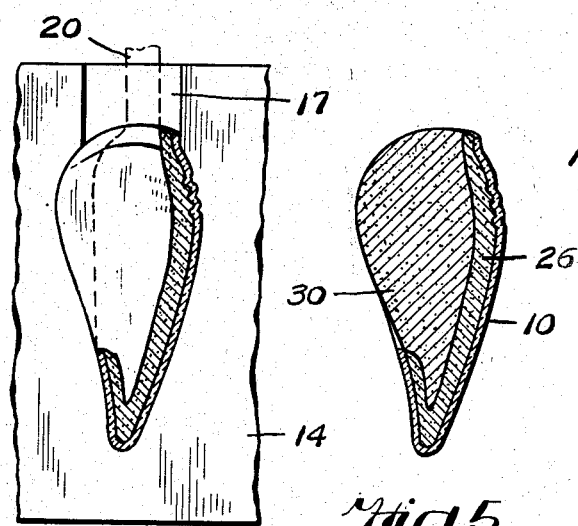
Fig.4.   Fig.5.
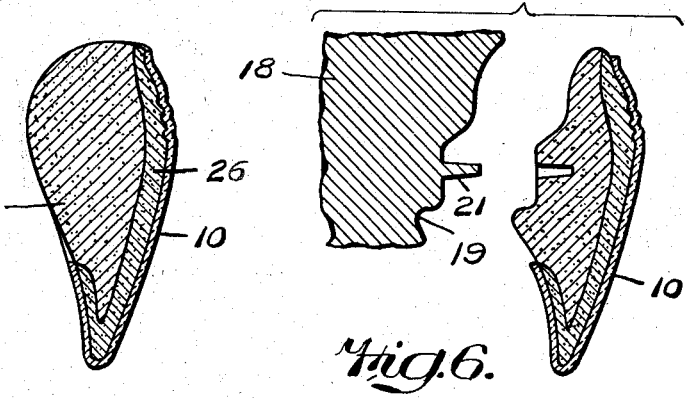
Fig.6.
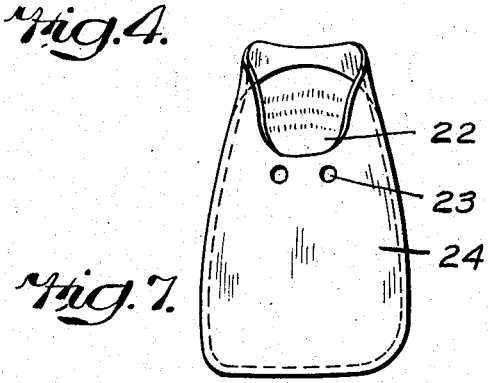
Fig.7.
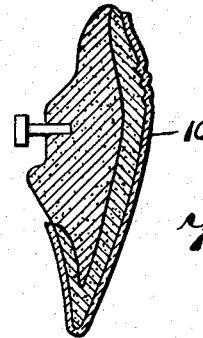
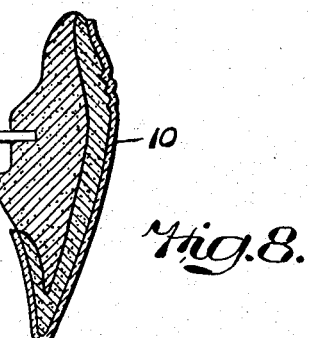
Fig.8.
INVENTOR
JACOB A. SAFFIR
BY W. G. Sullivan
ATTORNEY Patented Dec. 18, 1945

2,391,106

UNITED STATES PATENT OFFICE 2,391,106

METHOD OF MAKING ARTIFICIAL TEETH

Jacob A. Saffir, Chicago, Ill., assignor to The Dentists' Supply Company of New York, New York, N. Y., a corporation of New York Application September 24, 1941, Serial No. 412,057

6 Claims. (Cl. 18—55.1)

This invention relates to a novel method of making artificial teeth which is relatively simple and economical, and at the same time provides an improved tooth structure.

Heretofore, it has been common practice to employ two or three piece molds in forming artificial teeth, and the teeth usually consist of a relatively translucent enamel and a relatively opaque body portion. The enamel was usually molded first and then biscuited prior to molding the body portion thereto. After the body portion was molded to the enamel the tooth was biscuited, removed from the mold, and permanently hardened by the application of heat. A binder was employed to insure that the tooth would maintain its molded form upon removal from the mold. Further, the above described method of forming artificial teeth required considerable manual work, and after the tooth was biscuited, a trimming operation was necessary to remove excess material at the parting line.

I have devised a method of making artificial teeth which eliminates the above-mentioned disadvantages.

It is a primary object of this invention to provide an improved method of forming artificial teeth.

Another object of the invention is to provide a method of forming artificial teeth which will be more natural looking and pleasing in appearance than teeth formed by prior methods.

Another object of the invention is to provide a method of making artificial teeth which can be economically adapted to large scale production, and wherein manual operations are reduced to a minimum.

Another object of the invention is to provide a method of forming artificial teeth wherein the resultant teeth may have markings simulating markings frequently found in natural teeth.

Another object of the invention is to provide a method of forming artificial teeth which are relatively non-porous in structure.

According to the invention, a thin sheath of material is formed which generally conforms in size and shape to a tooth which it is desired to produce. This sheath is formed of a material which will be transformed substantially entirely into fluid phase upon the application of heat, and at a predetermined temperature lower than the hardening temperature of the tooth material or materials used. The sheath is preferably encased in a two-part metal mold and a predetermined amount of enamel-forming material is disposed in the sheath through an opening in the top portion of the sheath. A die of desired shape is then projected into the sheath under pressure, and forces the enamel material into contact with the sheath walls, and provides an outer layer of enamel-forming material. One or more additional layers are provided in a similar manner, and after the tooth structure is thus molded the molded tooth and encasing sheath are removed from the mold. The lingual surface of the tooth may then be shaped and anchoring pins inserted, or holes provided for the reception of anchoring pins after the tooth is hardened. The tooth and sheath are then disposed in a conventional furnace and the teeth fired or hardened in the usual manner. During the hardening process the sheath is destroyed, and since it is not necessary to provide a binder the resultant tooth has a compact strong structure. Thinned-out areas may be provided in one or more layers for the reception of material of an adjacent layer whereby contrasting color areas will be provided in the finished tooth.

The drawing illustrates embodiments of my invention and the views therein are as follows:

Figure 1 is a cross-sectional view of a mold which I may employ showing a destructible sheath in front elevation, Figure 2 is a rear elevational view of the sheath illustrated in Figure 1, Figure 3 is a section taken along the line 3—3 of Figure 2, Figure 4 is a cross-sectional view similar to Figure 3 showing a layer of enamel tooth-forming material in the sheath, Figure 5 shows body-forming material molded to the enamel material, Figure 6 shows the tooth structure of Figure 5 after the lingual surface has been shaped to conventional form by the die illustrated, Figure 7 is a rear elevational view of a modified form of sheath which I may use, and Figure 8 is a view similar to Figure 7 showing an anchoring pin inserted in the tooth.

Referring now to the drawing, and particularly Figures 1, 2 and 3, I have illustrated at 10 a sheath generally conforming to a tooth of a desired size and shape. This sheath is in the form of an envelope open at the top, as indicated at 11, and at the lingual side, as indicated at 12. The sheath is formed of a material which will be transformed substantially entirely into fluid phase by the application of heat, and at a temperature below the fusing or hardening temperature of the tooth material. If several tooth materials are employed in forming the tooth, and each of the materials have a different fusing or hardening temperature, the sheath is formed of a material which will be transformed into fluid phase at a temperature below the hardening temperature of the tooth material having the lowest hardening temperature. If the tooth is formed of porcelain the sheath material should be transformable at a temperature below 1500° F., and if the tooth is formed of synthetic resins the transformable temperature of the sheath would ordinarily be somewhat lower. When porcelain tooth materials are employed, the hardening temperature is the fusing or solidification temperature of the porcelain material. When synthetic resin tooth materials are employed, the hardening temperature is that at which polymerization takes place. Consequently, the term "hardening temperature" as used herein and in the appended claims in every case refers to the temperature to which, or above which, the tooth material must be heated so that after removal from the mold (and cooling) a finish hardened tooth is produced. I have found that a very satisfactory material for the sheath is cellulose nitrate although cellulose acetate and various other synthetic resins can be used.

The particular manner of forming the sheath constitutes no essential part of the present invention, and it may be formed by depositing a film of the material around a solid tooth form. Inasmuch as the incisal end of the sheath is wider than the gingival end it will be necessary to split the sheath longitudinally to remove the same from the tooth form, and subsequently join the split edges. Also, a collapsible tooth form may be used which will eliminate the necessity of splitting the sheath in order to remove the same. However, I preferably employ a two-piece mold, as illustrated in Figure 1, wherein mold part 13 abuts mold part 14 along the longitudinal medial line of the sheath, as illustrated at 16. The mold is preferably formed of metal, and a film of sheath material is deposited in the pocket formed by the cooperating mold parts by spraying or the like. This may be done by temporarily disposing nozzles within the pocket through opening 17 provided at the top of the mold to apply a coating of the material to predetermined areas in the pocket whereby the openings 11 and 12 will be provided.

A predetermined amount of enamel-forming tooth material in powdered form is then placed in the sheath while the sheath is encased by the mold parts, and a die 20 of predetermined size and shape is then projected into the sheath through opening 17, whereby the enamel-forming material will be subjected to pressure and forced into contact with the sheath walls to form a layer of enamel-forming material, as illustrated in Figure 4. A predetermined amount of body-forming material in powdered form sufficient to complete the balance of the tooth is then disposed in the sheath, and subjected to pressure, whereby a tooth structure, as illustrated in Figure 9, will be provided.

Subsequently, the lingual surface of the tooth may be shaped to a desired form to provide a ridge lap and holes for receiving anchoring pins, as illustrated in Figure 6. The particular manner of shaping the tooth lingual surface constitutes no essential part of the present invention, but I have found that this can be easily effected by employing a die 18, illustrated in Figure 6, having a forming surface 19 of a desired shape and provided with pins 21 which will project into the tooth structure to form the holes for the anchoring pins. Pins made of a material suitable to withstand the hardening temperature of the tooth material may then be inserted, or coils or the like adapted to be united with the anchoring pins after the tooth is hardened may be inserted.

The tooth structure encased in the sheath is then subjected to a temperature which is sufficient to harden the tooth material, and in the event a porcelain tooth is being formed this will be the vitrifying temperature of the tooth material. The teeth can be hardened in the usual manner by disposing the same in a furnace for a desired time, and the sheath will be destroyed at a temperature below the hardening temperature of the teeth. The residue and/or gases formed upon the destruction of the sheath 10 will not have any deleterious effect on the teeth, and the gas escaping from the furnace can be vented, if desired.

Due to the fact that the sheath 10 remains encased in the mold parts 13 and 14 during the time that the tooth is being molded, considerable pressure may be applied to the tooth material which results in a compact and strong tooth structure. An important feature of my invention is that the usual binder heretofore employed for its cohesive effect, and necessary to prevent breakage of the molded tooth upon removal from the mold is eliminated. It is not necessary in practicing my invention to remove the molded tooth from the encasing sheath 10 prior to finish hardening the tooth. A binder is not necessary, and this fact, together with the considerable pressure which can be applied when molding the tooth, insures a strong and relatively compact tooth structure. Further, I contemplate that the molding of the tooth may occur in a vacuum chamber and that air normally entrained in the tooth structure will be largely removed resulting in an increased compactness of the finished tooth and minimizing the shrinkage during subsequent hardening temperatures.

It will now be understood that numerous operations heretofore necessary have been eliminated by my improved process. For example, it is not necessary to biscuit the enamel material prior to applying the body material, and it is not necessary to biscuit the molded tooth prior to removing the same from the mold. Further, no parting line is necessary, and trimming operations to remove excess material formed at the parting line when a two or three piece mold is employed are dispensed with. Further, since certain manual operations heretofore necessary are not required, the process is largely susceptible of automatic operation, and line production whereby considerable quantities of teeth may be produced economically in a relatively short period.

Referring now to Figure 7, I have shown a modified form of sheath wherein the opening 22 at the lingual surface of the sheath is somewhat smaller than the opening 12, and holes 23 for the reception of anchoring pins are provided in the lingual surface 24 of the sheath below opening 22. After removing the molded tooth and sheath from the mold parts 13 and 14, holes for the reception of anchoring pins may be provided at the lingual surface of the molded tooth by projecting drills or any suitable forming instrument through holes 23. Holes 23 assist in supporting the anchoring pins while the tooth is being hardened.

It is understood that the process described may be used in forming either porcelain teeth or synthetic resin teeth. Of course, as previously pointed out the temperature at which the sheath will be destroyed will be governed by the fusing or hardening temperatures of the tooth materials employed.

Although I have shown and described preferred forms of my invention, I contemplate that numerous and extensive departures may be made therefrom without departing from the spirit of my invention and the scope of the appended claims.

The invention is hereby claimed as follows:

1. The method of making artificial teeth of heat hardenable material which includes forming a unitary sheath conforming generally to the size and shape of a tooth to be produced, the sheath having an opening in the top portion thereof and being formed of a plastic resin material which makes the sheath destructible by heat at a temperature below the hardening temperature of the tooth material employed, disposing a predetermined amount of heat hardenable tooth material in the sheath through said top opening, applying pressure to force said material into contact with the sheath walls, and heating said sheath and tooth material to a temperature at least as high as the hardening temperature of the tooth material and above the temperature at which the sheath is destructible.

2. The method of forming artificial teeth of heat hardenable material which includes forming a unitary sheath conforming generally to the size and shape of a tooth to be produced, the sheath having an opening in the top portion thereof and being formed of a material which makes the sheath destructible by heat at a temperature below the hardening temperature of the tooth material, encasing the sheath walls in rigid material, disposing a predetermined amount of heat hardenable tooth material in the sheath through said opening, applying pressure to force said tooth material into contact with the sheath walls, removing the encasing rigid material, and then heating the sheath and tooth material to a temperature at least as high as the hardening temperature of the tooth material and above the temperature at which the sheath is destructible.

3. The method of forming artificial teeth of heat hardenable material which includes forming a unitary sheath conforming generally to the size and shape of a tooth to be produced, the sheath having an opening in the top portion thereof and being formed of a plastic resin material which makes the sheath destructible by heat at a temperature below the hardening temperature of the tooth material, disposing a predetermined amount of heat hardenable tooth material in the sheath through said opening, applying pressure to force said material into contact with the sheath walls and provide an outer layer of tooth material and a central cavity, disposing a predetermined amount of different heat hardenable tooth material in said cavity, applying pressure on said different tooth material to shape the same, and then heating the sheath and tooth materials to a temperature at least as high as the highest hardening temperature of the tooth materials and above the temperature at which the sheath is destructible.

4. The method of forming artificial teeth of heat hardenable material which includes providing a unitary sheath of generally tooth-form having an opening in the top thereof, said sheath being formed of a material which makes the sheath destructible by heat, inserting a predetermined amount of heat hardenable tooth material in the sheath through said opening, applying pressure on said material internally of the sheath to form an outer layer of tooth material conforming generally to the shape of the sheath, and then heating the sheath and encased tooth structure to a temperature at least as high as the hardening temperature of the tooth material and above the temperature at which the sheath is destructible.

5. The method of forming artificial teeth of heat hardenable material which includes providing a rigid two-part mold having an upwardly open cavity therein conforming generally to the size and shape of a tooth to be produced, forming a thin film of plastic resin material on the cavity walls to provide a unitary sheath destructible by heat and having an opening in the top portion thereof, disposing a predetermined amount of heat hardenable tooth forming material in said sheath, projecting shaping means through said opening to exert pressure on the tooth material and force the same into contact with the sheath walls, separating the mold parts and removing the sheath walls, separating the mold parts and removing the sheath and encased tooth material therefrom, and heating the sheath and tooth material to a temperature at least as high as the hardening temperature of the tooth material and above the temperature at which the sheath is destructible.

6. The method of forming artificial teeth of heat hardenable material which includes providing a unitary sheath of generally tooth-form having an opening at the top thereof extending into the lingual surface of the sheath, the sheath being formed of plastic resin material which makes the sheath destructible by heat at a temperature below the hardening temperature of the tooth material, disposing a predetermined amount of heat hardenable tooth material in the sheath through said opening, applying pressure to force said material into contact with the sheath walls and provide a compact molded mass, shaping the lingual surface of said molded mass to conventional form, and then heating the sheath and molded mass to a temperature at least as high as the hardening temperature of the tooth material and above the temperature at which the sheath is destructible.

JACOB A. SAFFIR.